(12) United States Patent
Beigel et al.

(10) Patent No.: US 8,237,561 B2
(45) Date of Patent: Aug. 7, 2012

(54) SEMI-ACTIVE RFID TAG AND RELATED PROCESSES

(75) Inventors: Michael L. Beigel, Encinitas, CA (US); John R. Tuttle, Boulder, CO (US)

(73) Assignee: Precision Dynamics Corporation, San Fernando, CA (US)

( * ) Notice: Subject to any disclaimer, the term of this patent is extended or adjusted under 35 U.S.C. 154(b) by 1726 days.

(21) Appl. No.: 11/458,459

(22) Filed: Jul. 19, 2006

(65) Prior Publication Data
US 2007/0018832 A1  Jan. 25, 2007

Related U.S. Application Data

(60) Provisional application No. 60/700,956, filed on Jul. 19, 2005.

(51) Int. Cl.
*G08B 13/14* (2006.01)
(52) U.S. Cl. ........ 340/572.1; 340/572.7; 340/10.33
(58) Field of Classification Search ....... 340/573.1, 340/572.1–572.8, 10.33, 10.1, 5.61; 342/30, 342/42, 51; 455/73, 574; 235/380, 487, 235/492
See application file for complete search history.

(56) References Cited

U.S. PATENT DOCUMENTS

| | | | |
|---|---|---|---|
| 5,469,178 A * | 11/1995 | Nguyen et al. ............... 343/702 |
| 5,493,805 A | 2/1996 | Penuela et al. |
| 5,920,181 A * | 7/1999 | Alberkrack et al. .......... 320/146 |
| 5,973,598 A | 10/1999 | Beigel |
| 5,973,600 A | 10/1999 | Mosher, Jr. |
| 6,104,920 A | 8/2000 | Llewellyn et al. |
| 6,181,287 B1 | 1/2001 | Beigel |
| 6,282,407 B1 | 8/2001 | Vega et al. |
| 6,414,543 B1 | 7/2002 | Beigel et al. |
| 6,593,845 B1 | 7/2003 | Friedman et al. |
| 6,642,782 B2 | 11/2003 | Beigel et al. |
| 6,726,099 B2 * | 4/2004 | Becker et al. ................ 235/380 |
| 6,738,273 B2 * | 5/2004 | Shearon ........................ 363/60 |
| 6,784,017 B2 | 8/2004 | Yang et al. |
| 6,944,424 B2 * | 9/2005 | Heinrich et al. ............. 455/41.1 |
| 7,106,173 B2 * | 9/2006 | Scott et al. ................... 340/10.1 |
| 7,132,946 B2 * | 11/2006 | Waldner et al. ............ 340/572.1 |
| 7,893,816 B1 * | 2/2011 | Kwan ........................ 340/10.34 |
| 2003/0165128 A1 | 9/2003 | Sisodia et al. |
| 2003/0169207 A1 | 9/2003 | Beigel |
| 2003/0173408 A1 | 9/2003 | Mosher, Jr. et al. |
| 2003/0174049 A1 | 9/2003 | Beigel et al. |

FOREIGN PATENT DOCUMENTS

| | | |
|---|---|---|
| GB | 2374490 | 10/2002 |
| WO | 99/34325 | 7/1999 |
| WO | 03009417 | 1/2003 |
| WO | 03043101 | 5/2003 |

* cited by examiner

*Primary Examiner* — Anh V La
(74) *Attorney, Agent, or Firm* — Kelly & Kelley, LLP

(57) ABSTRACT

An improved radio frequency identification (RFID) tag and related reader system and process are provided, wherein the RFID tag includes an on-board battery for enhanced signal transmission range, relatively rapid signal transmission speed, and optimized completion of a data transaction between the tag and a reader. The RFID tag further includes a power management system for activating the tag battery on an as-needed basis, and for thereupon enabling limited portions of the tag circuitry as required for a specific communication protocol, thereby conserving battery power and prolonging battery service life. In one preferred form, the battery is integrated with an antenna structure of single or dual mode with respect to frequency or type. This combination battery-antenna may be designed for recharging from a source of ambient energy.

85 Claims, 11 Drawing Sheets

SEMI-ACTIVE RFID TAG AND RELATED PROCESSES

BACKGROUND OF THE INVENTION

This invention relates generally to improvements in radio frequency identification (RFID) devices or tags, and related reader systems and processes for communicating therewith. More particularly, this invention relates to an improved, semi-active RFID tag adapted for association with a specific individual or object, as by mounting onto or within a wristband or the like, wherein the RFID tag incorporates an on-board thin, flexible, printable battery compatible with enhanced signal transmission range and relatively rapid signal transmission speed, and further wherein the tag includes a power management system for conserving battery power and thereby prolonging battery service life. The power management system is designed for activating the tag battery on an as-needed basis, and for minimizing battery power drain by enabling limited portions of the tag circuitry as required for a specific communication protocol and its operation predetermined by "super commands".

Radio frequency identification (RFID) devices or tags are generally well known in the art, wherein a relatively compact electronic device or circuit is mounted onto or otherwise incorporated within a convenient structure such as an identification card or wristband or the like adapted for mounting onto a specific individual or object. The RFID tag is designed for receiving and storing identification and other information associated with the person or object attached thereto, and a compatible reader is provided for radio frequency communication with the RFID tag for positively identifying the person or tracking the person or object, etc. Such identification bands have been widely used or proposed for use, e.g., for patient identification in a medical facility or the like, for personnel identification and/or access control at secured facilities such as military or industrial installations and the like, for patron identification at amusement parks and events such as concerts and the like, for airport passenger and/or baggage identification, for identification and tracking shipped parcels, and for animal control, and the like. When used for patient identification in a medical facility, the RFID tag may further receive and store important additional information such as patient medical condition and/or treatment regimen. For illustrative examples of identification bands and the like including RFID technology, see U.S. Pat. Nos. 5,493,805; 5,973,598; 5,973,600; 6,181,287; and 6,414,543, and copending U.S. Publications US 2003/0173408 and US 2003/0174049, which are incorporated by reference herein.

In the past, RFID devices or tags have generally been designed for receiving power from the ambient field radiating from a reader. That is, the RFID tag has not been provided with an on-board battery for powering the RFID circuitry. Instead, the RFID circuitry has been externally powered by a magnetic field produced by the reader in the course of communicating with the RFID tag. In such so-called "passive" RFID tags, communication is inherently and necessarily initiated only by the reader, and such communication has been limited to relatively short-range signal transmission and relatively slow data transmission speeds. By way of example, in a typical RFID tag powered by a magnetic field (H-field) radiating from a reader, present power restrictions imposed by the Federal Communications Commission (FCC) dictate a relatively short-range communication on the order about one meter or less. For alternative passive RFID tags powered by an electric field (E-field), the communication range is longer, i.e., up to about 10 meters. Accordingly, for passive-powered RFID tags, the tag and reader must be in relatively short-range proximity to each other, while the transmission speed effectively limits the amount and type of data to be transferred.

To achieve increased signal transmission range and data transfer speed, so-called "active" RFID devices or tags have been produced with an on-board battery for powering the RFID circuitry. However, battery power drain has imposed a significant limitation on the utility of such active RFID tags. That is, in a compact flexible RFID tag of the type used on a patient wristband on the like, size and other physical restraints on battery design, including but not limited to flexibility requirements in a compact and lightweight wristband design, inherently results in an on-board battery having limited charge storage capacity. In an attempt to increase battery service life in this environment, the RFID tag is normally in a de-activated or "off" state, with circuit activation being initiated by an appropriate signal from a compatible reader. Accordingly, similar to a "passive" tag, communication is again initiated only by the reader. Upon activation, the circuitry incorporated into the "active" RFID tag has been fully enabled or powered up, thereby maximizing battery power drain during data transactions.

There exists, therefore, a significant need for further improvements in and to RFID devices and tags, wherein a compact and lightweight thin and flexible on-board battery is provided for improved signal transmission range and data transmission speed, but further wherein the RFID tag includes a power management system for minimizing battery power drain upon circuit activation. In addition, it is desirable to provide such improved RFID tag which is not limited to reader-initiated communication, but instead may perform a variety of tag-initiated communication protocols and provides full utilization of the surface area of the tag for enhancing communication distance. The present invention fulfills these needs and provides further related advantages.

SUMMARY OF THE INVENTION

In accordance with the invention, a semi-active radio frequency identification (RFID) tag and related reader system and process are provided, wherein the RFID tag includes an on-board flexible battery in combination with a power management system for optimizing data transaction quality by controllably enabling limited portions of the tag circuitry in a manner designed to conserve battery power and thereby prolong battery service life while maximizing the probability of a successful and complete data transaction. The on-board battery for powering the tag circuitry provides enhanced signal transmission range and variably rapid signal transmission speed suitable for use in a broad range of communication protocols, which in some embodiments may include tag-initiated communication.

The semi-active RFID tag is adapted for physical attachment onto a person or object associated therewith, as by incorporating the RFID tag into a lightweight flexible wristband or the like, wherein the wristband may be disposable. The RFID tag includes tag circuitry comprising, in accordance with one preferred form, a passive receiver including a suitable antenna and wake-up circuitry for signaling a control processor in the event that a communication session has been requested or initiated by a nearby reader. In one form, the receiver connects the processor or a circuit associated with the processor to the on-board battery. The processor then enables selected communication circuit blocks by appropriately coupling such circuit blocks to the on-board battery at times, durations and sequences sufficient to accommodate a successful communication transaction with the reader. Such communication circuit blocks may include analog-to-digital converters (ADC), and/or control and communications input-output (I/O) circuitry. By selectively enabling or powering limited portions of the tag circuitry on an as-needed basis only, battery power drain is substantially minimized while achieving the benefits of an optimized combination of enhanced communication range and improved data transfer speed.

The control processor may be adapted as by suitable programming to accommodate relatively complex communication protocols which may include tag-initiated commands and/or execution of so-called "super commands" and/or intelligent multiplexing. That is, the processor may be suitably coupled to the on-board battery with minimal power drain, and programmed for activating or enabling selected portions of the tag circuitry for signaling a nearby reader to initiate a communication session therewith. Such tag-initiated communication may be employed in the execution of super commands, wherein the processor regulates the tag circuit blocks in a manner performing a relatively complex sequence of tasks such as monitoring of a patient heart rate and communicating heart rate data to a reader at regular timed intervals. Alternately, or in combination, such tag-initiated communication may be used in intelligent multiplexing wherein the processor regulates data transmission at different frequencies and powers such as transmitting routine or non-alarm patient heart rate data at one frequency to a nearby reader while switching to transmit non-routine or alarm heart rate data to one or more distant readers located, e.g., at a central nurse station. In each instance, the control processor selectively switches tag circuit blocks on and off in a manner compatible with conservation of battery power.

For optimizing the benefits of small size and minimum cost, the semi-active tag may incorporate a single antenna structure designed for dual mode operation with respect to frequency and/or type. More particularly, the antenna structure may be adapted for relatively low power and short-range magnetic field (H-field) signal reception and/or transmission, or alternately for comparatively higher power and longer-range electric field (E-field) reception and/or transmission. In one preferred form, a single antenna structure is designed for respective low and high power operation at different frequencies which preferably conform with standard communication frequencies such as 13.56 megahertz (MHz) and 915 MHz compatible with existing reader technology.

In accordance with a further aspect of the invention, the on-board battery may be integrated with the antenna structure which may comprise a flexible construction. This combination battery-antenna may include a filter to protect the battery from AC (alternating current) signal voltages exceeding the battery voltage capacity, or the battery may be immune to AC signal currents impressed upon it and further may be designed for recharging from a source of ambient energy or an electrical connection to a re-charger. In the event of battery failure, the tag may be adapted to default to a conventional passive tag mode of operation.

Other features and advantages of the present invention will become apparent from the following more detailed description, taken in connection with the accompanying drawings which illustrate, by way of example, the principles of the present invention.

BRIEF DESCRIPTION OF THE DRAWINGS

The accompanying drawings illustrate the invention. In such drawings.

BRIEF DESCRIPTION OF THE PREFERRED EMBODIMENTS

Figure 1:
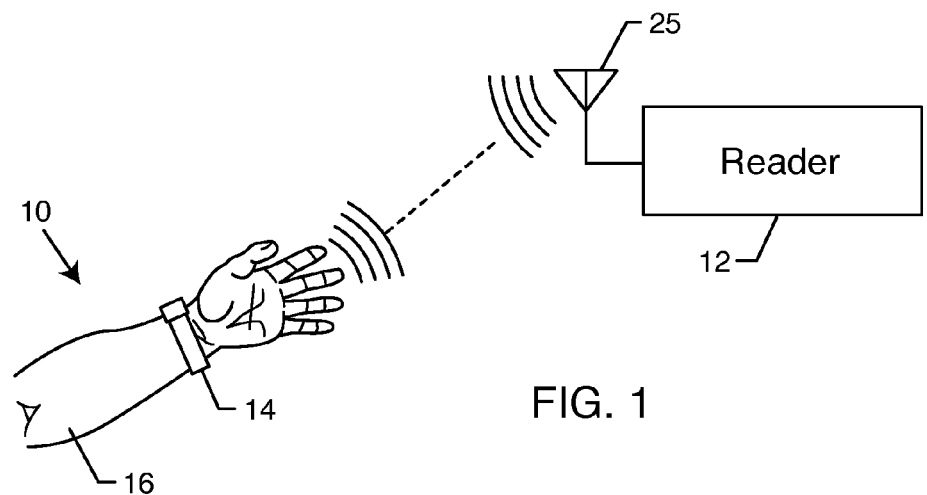
FIG. 1 is a fragmented schematic view illustrating a semi-active RFID tag in accordance with the invention, incorporated into a wristband, and disposed in radio frequency communication with a reader.

As shown in the exemplary drawings, an improved radio frequency identification (RFID) device or tag referred to generally in FIG. 1 by the reference numeral 10 is provided for communication with an associated reader 12. FIG. 1 shows the RFID tag 10 mounted onto or otherwise incorporated within a structure such as the illustrative flexible wristband 14 for mounting or attaching the tag 10 onto a person 16 or object associated therewith. In accordance with a primary aspect of the invention, the tag 10 includes an on-board flexible battery 18 (FIGS. 2-4) in combination with a power management system for controllably enabling limited portions of the tag circuitry in a manner designed to conserve battery power and thereby prolong battery service life. The inclusion of the on-board flexible battery 18 beneficially enhances signal transmission range and accommodates relatively rapid and optimized signal transmission speeds suitable for use in a broad range of communication protocols, which in some embodiments may include tag-initiated communication.

The semi-active RFID tag 10 of the present invention is adapted to receive and store information such as identification and other data pertaining to the associated person or object 16. In this regard, the RFID tag 10 can be used, e.g., for patient identification in a medical facility or the like, or for personnel identification and/or access control at secured facilities such as military or industrial installations and the like, or for patron identification at amusement parks and events such as concerts and the like, or for airport passenger and/or baggage identification, or for identifying and tracking shipped parcels, or for animal control, and other environments wherein it is necessary or desirable to identify and/or monitor or otherwise retrieve and use information unique to the person or object 16 to which the RFID tag 10 is attached. When used for patient identification in a medical facility, the RFID tag 10 may further receive and store important additional information such as patient medical condition and/or treatment regimen. For illustrative examples of identification bands and the like including RFID technology, see U.S. Pat. Nos. 5,493,805; 5,973,598; 5,973,600; 6,181,287; and 6,414,543, and copending U.S. Publications US 2003/0173408 and US 2003/0174049, which are incorporated by reference herein.

The inclusion of the on-board battery 18 permits the RFID tag 10 to communicate with a reader 12 over an enhanced transmission range, and at a faster data transmission speed, and with optimized data transaction reliability as compared to a conventional so-called passive RFID tag which relies upon the reader-generated ambient magnetic field for circuit power and enablement. However, in accordance with the invention, the semi-active RFID tag 10 further comprises a power management system including an on-board control processor 20 (FIGS. 2-4) for controllably enabling limited portions of the tag circuitry in a manner designed to conserve battery power and thereby prolong battery service life. That is, the processor 20 couples the battery 18 to selected portions or blocks of the tag circuitry in a manner, timing and sequence sufficient for successful completion of a specific communication transaction with the reader 12, but also in a manner which minimizes power consumption requirements. Each tag circuit block essential to a specific communication transaction is enabled or powered only for a minimum time needed to complete the transaction, while other tag circuit blocks non-essential to the specific transaction remain non-enabled. As a result, battery power drain is substantially minimized, whereby a relatively small and preferably thin film and/or flexible battery can be used with extended battery service life.

Figure 2:
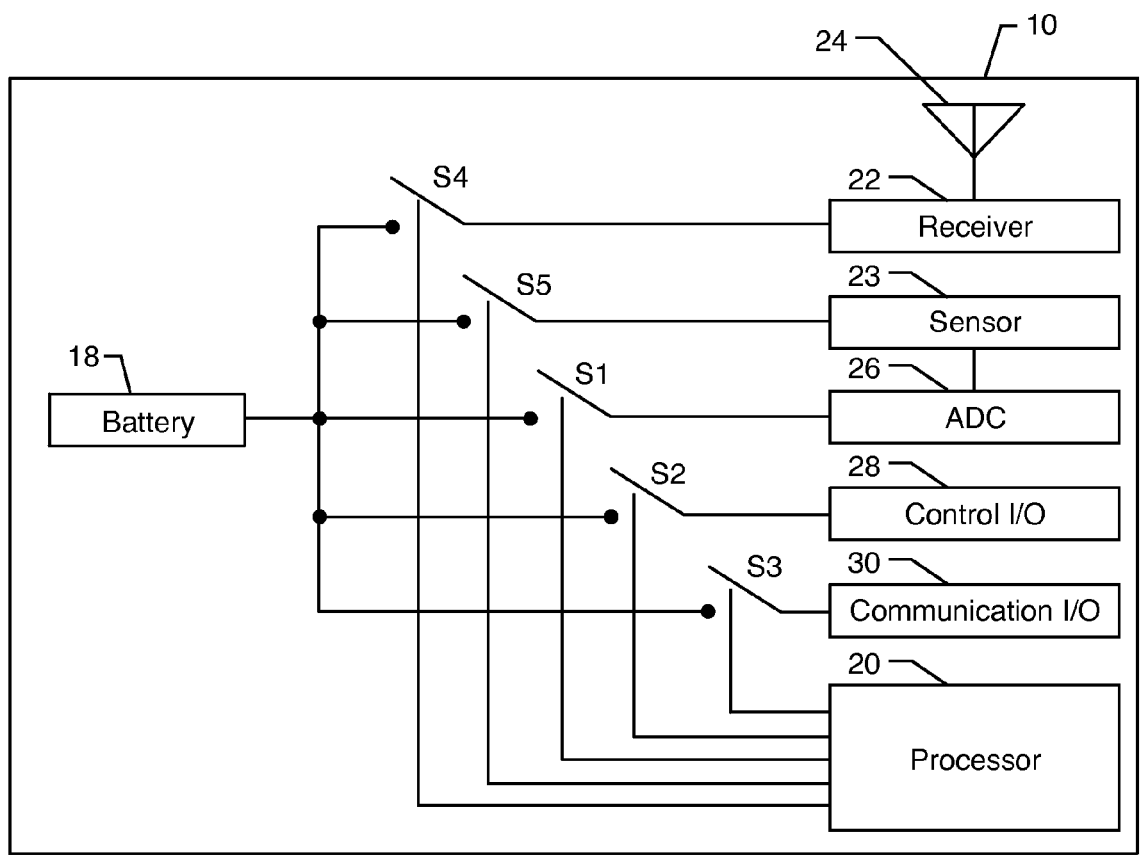
FIG. 2 is schematic block diagram of the semi-active RFID tag and depicting processor-regulated enabling of multiple communication circuit blocks.
Figure 5:
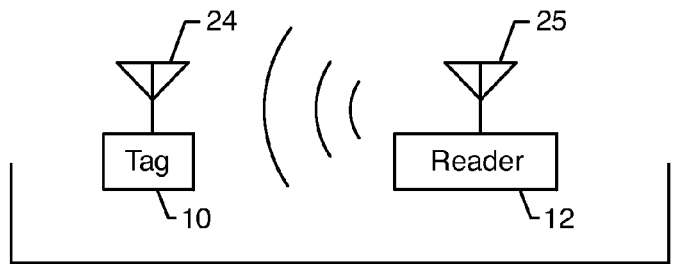
FIG. 5 is a schematic diagram showing reader-initiated communication with the semi-active tag.
Figure 6:
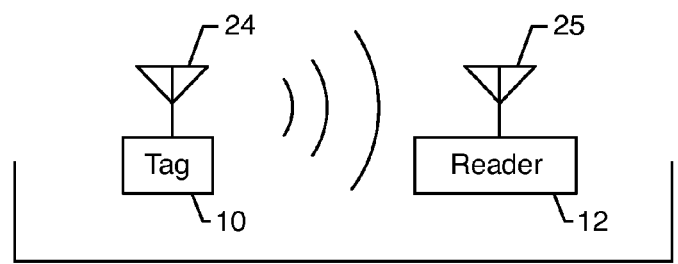
FIG. 6 is a schematic diagram showing tag-initiated communication with a reader.

FIG. 2 is a schematic block diagram depicting the general components of the semi-active RFID tag 10. As shown, a receiver 22 including an antenna 24 is provided for receiving a wake-up signal from an associated reader 12 (FIGS. 1 and 5) indicating that a communication session with the tag 10 is desired. The receiver 22 may include suitable circuitry known in the art, such as passive circuitry adapted to be powered by the ambient magnetic field generated by the reader 12. Alternately, it will be understood that the wake-up circuitry of the receiver 22 may comprise an active receiver circuit block coupled to and powered by the on-board battery 18. Or, if desired, the receiver 22 may comprise a combination passive/active components wherein the wake-up circuitry is powered by the ambient magnetic field (in a minimum power consumption mode) for coupling other portions of the receiver circuitry to the on-board battery 18 in response to receiving a wake-up signal from the associated reader 12. An active battery powered wake-up circuit can subsequently be switched into the circuit for a period of time in which there is a high probability of subsequent data transactions. In each configuration, persons skilled in the art will recognize and appreciate that the receiver 22 will further incorporate a transmitter means for transmitting data to the reader 12 (FIGS. 1 and 6), in accordance with the particular communication protocol requested by the reader.

The control processor 20 is shown in FIG. 2 coupled to the on-board battery 18 and functions when activated to enable and regulate multiple circuit blocks of the RFID tag 10 in a manner consistent with minimal battery power drain and maximum battery service life. In particular, FIG. 2 shows the processor 20 as an active component coupled to the on-board battery 18. The processor 20 is adapted as by programming to control respective coupling of circuit blocks such as an analog-to-digital converter (ADC) circuit block 26, a control input/output (I/O) circuit block 28, and a communication input/output (I/O) circuit block 30 to the on-board battery 18 as by means of a series of switch elements SI, S2 and S3. These circuit blocks provide input-output interfaces for use, in the example of a medical environment, with peripheral equipment coupled to a patient, implanted systems, or battery charging circuits. Persons skilled in the art will understand that these circuit blocks 26, 28 and 30 are illustrative only, and that other and/or additional types of communication circuitry may be employed. In operation, the processor 20 programmably couples the multiple circuit blocks to the on-board battery 18 each at an appropriate time and each for an individual minimum time interval consistent with participation of each respective circuit block in an optimized communication transaction while minimizing battery power drain. In addition, a switch element S4 may be provided for controllably coupling and uncoupling battery-powered elements of the receiver 22 relative to the battery 18, e.g., during time intervals when the receiver 22 is not receiving or transmitting data, or is not performing any other active function, or is not anticipating a high density of data transactions, for minimizing battery power drain attributable to the receiver.

Figure 3:
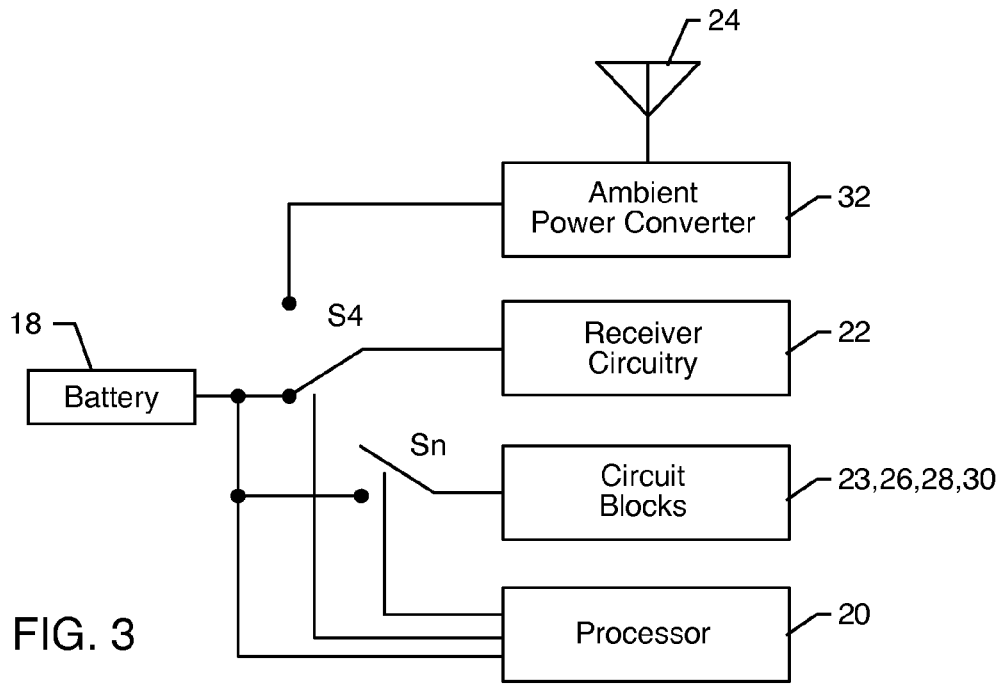
FIG. 3 is a schematic block diagram depicting an alternative preferred form of the invention.
Figure 4:
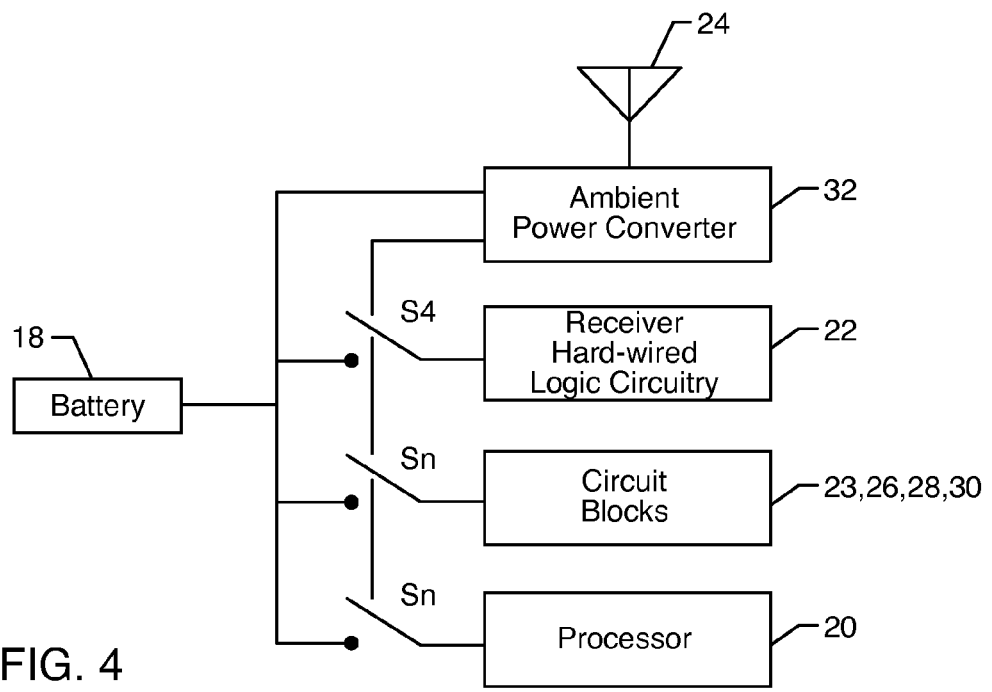
FIG. 4 is another schematic block diagram depicting another alternative preferred form of the invention.

FIG. 3 depicts one alternative form of the invention, wherein the processor 20 is constantly powered by the battery 18, and wherein the processor 20 controls the settings of switches S4-Sn, and the receiver 22 is adapted for alternative operation in an active mode coupled via the switch element S4 to the on-board battery 18, or in a passive mode coupled via an ambient power converter 32 to the antenna and adapted for response to the reader-generated ambient magnetic field. The control processor 20 appropriately positions the switch element S4 to select active or passive mode operation. In one preferred form, the processor 20 is adapted to switch the receiver 22 and the entire tag circuit to a default passive mode in the event that battery power is completely or substantially completely drained. FIG. 4 shows a further alternative variation, wherein switches S4-Sn are set by circuitry in the ambient power converter 32 when the tag is within range of a reader's magnetic field, and are set by a command from the reader. One of the switches Sn also connects power to the processor 20 if commanded to do so by the reader. As one example, the processor switch Sn would not be set to couple power to the processor 20 in the event processor operation and related battery power drain was not required, e.g., such as when a tag ID response was all that was requested by the reader. By contrast, for more complex tasks requiring operation of the tag processor 20 and/or one or more of the related circuit blocks 26, 28, or 30, such as tag operation to acquire patient data from a temperature sensor or the like, the reader would command closure of the processor switch Sn for turning the processor "on", to perform the reader-requested task.

In operation, a communication session is typically initiated by the reader 12 by sending appropriate wake-up data such as preamble and start bits via a reader antenna 25 (FIGS. 1 and 5) for reception by the receiver 22. In general, the receiver 22 signals the control processor 20, which then programmably enables and disables selected circuit blocks of the tag circuitry in the course of responding to the reader 12, as by modulating the impedance of the tag antenna 24 in a pattern representing data which is thus transmitted back to the reader 12 for demodulation and interpretation. The data transmitted by the RFID tag 10 back to the reader 12 typically comprises identification information such as an ID number. Other types of data can be generated and transmitted by the tag 10.

The wake-up circuitry consumes minimal power (active wake-up circuit) or no power (passive wake-up circuit), and sends a wake-up signal to the power-controlling circuitry of the RFID tag when the tag is in the vicinity of sufficient signal strength to enable a successful date transaction with the tag powered by the internal battery. The wake-up circuitry may be connected to the tag antenna, or it may be an integral part of the tag antenna.

For a "passive" wake-up circuit, it is assumed that the circuit needs to derive a sufficient output signal from a relatively weak input signal. A passive wake-up circuit may be as simple as a tuned resonant circuit with a rectifier and charge storage means sufficient to activate a high-impedance (FET gate) switch actuator. The switch itself may provide a wake-up signal to the controller system, or alternatively may provide sufficient power to provide power to the control and/or other circuit functions. Instead of a simple rectifier, a "voltage multiplier" circuit may be used to provide a higher output voltage from a given ambient signal field.

For an "active" wake-up circuit, a low-power RF amplifier with voltage gain is powered by the tag battery, and can therefore sense a much weaker ambient signal than a passive circuit.

A semi-active RFID tag may initially operate with a passive wake-up circuit. Once the tag "wakes up" in response to an attempted communication from the reader, the wake-up circuit may be switched over to an active circuit for the duration and completion of the data transaction in process, to aid in the success of the data transfer. After the transaction is completed, the tag may be switched back to a passive wake-up mode, to conserve power between data-transaction events.

The semi-active RFID tag 10 may incorporate one or more sensors 23 as shown in FIG. 2 coupled to the ADC block 26 and also to the processor 20 by means of an additional switch S5, wherein such sensor or sensors are adapted for monitoring one or more parameters, e.g., such as a sensor fastened to or in contact with the skin of a patient in a medical facility environment to monitor a selected patient condition parameter (i.e., temperature, heart rate, and others), and for periodically transmitting such patient condition data back to the reader 12 in response to periodic polling by the reader 12, i.e., a reader-initiated communication session. Alternately, the RFID tag 10 may be designed for initiating a communication session with the reader 12 for purposes of transmitting data such as patient condition information. In either mode, the processor 20 is suitably programmed for selectively coupling and de-coupling multiple circuit blocks within the tag circuitry for appropriately enabling and disabling those circuit blocks in a manner consistent with the collection of the desired patient condition data, and for transmitting such data to the reader 12, while managing tag power consumption in a manner consistent with maximum battery service life. If the tag is in a mode which can initiate tag-to-reader communications without first being polled or "awakened" by a reader signal, the tag will consume some amount of battery power in this mode.

In one preferred form, the control processor 20 of the semi-active RFID tag 10 may be designed and programmed for operating various blocks of the tag circuitry to perform a variety of background tasks without requiring communication with a reader 12 for extended periods of time. During such background task mode, the controller 20 manages tag power consumption by appropriately enabling and disabling circuit blocks in a manner to minimize battery power drain. One example of such background task mode comprises one or more sensors for monitoring one or more patient condition parameters such as heart rate, wherein such sensor or sensors are coupled to appropriate tag circuit blocks, such as to the ADC block 26 (FIG. 2). The resultant collected data can be downloaded to a reader 12 using typically higher-power tag transmit and receive functions, in response to periodic polling of the tag 10 in a reader-initiated communication session, or alternately in response to a tag-initiated communication session.

Figure 7:
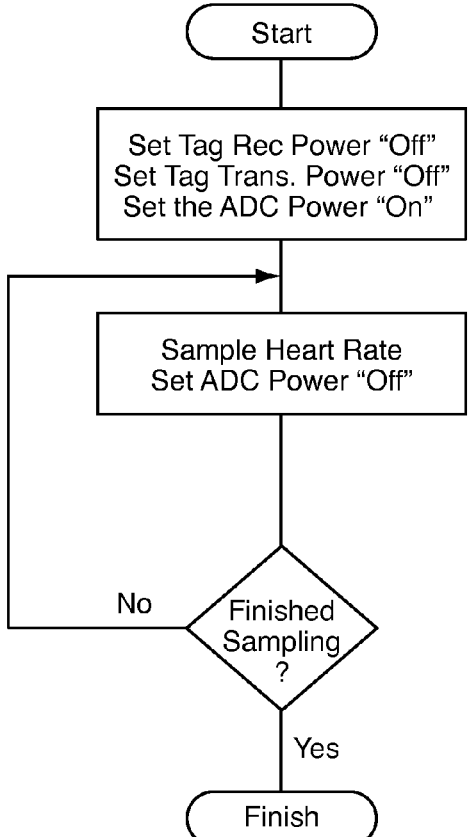
FIG. 7 is a flow chart showing execution of a super command communication protocol utilizing the semi-active tag of the present invention.

The foregoing form of the invention, including the background task mode, is particularly useful in execution of so-called "super commands", wherein the processor 20 executes subroutines for regulating the tag circuit blocks in a manner performing a relatively complex sequence of tasks such as monitoring of a patient heart rate and communicating heart rate date to a reader at regular timed intervals. Such operation is illustrated by the flow chart of FIG. 7, wherein an initial reader-initiated communication session causes the controller 20 to disable the tag receiver 22 (and related transmission circuitry) while activating the appropriate tag circuit blocks in a background task mode for collecting patient heart rate data over a prescribed period of time. When the data collection function is complete, or at appropriate intervals, the controller 20 enables the tag transmission circuitry for appropriately transmitting the collected data back to the reader 12. Persons skilled in the art will appreciate that data representing multiple parameters in a variety of different environments may be collected and transmitted back to the reader 12, or to a different reader, or to multiple readers, in response to a subsequent tag-initiated or reader-initiated communication session. In each configuration, the processor 20 manages tag power consumption in a manner minimizing battery power drain.

In a modified form of operation, including the above-described background task mode, the semi-active tag 10 may be used in so-called "intelligent multiplexing" wherein the processor 20 regulates data transmission to the reader 12 in response to the routine or non-routine character of the data collected. By way of example, patient heart rate data collected in the background task mode may reflect a normal or acceptable patient condition, whereby the controller 20 operates the tag 10 to collect the data for transmission to the reader 12 at normal routine intervals. In the event that the monitored parameter such as heart rate falls outside a normal or acceptable range, the processor 20 may be programmed for triggering an alarm mode as by immediately initiating a communication session with the reader 12 which may be located, e.g., at a central nurse station or the like.

Figure 8:
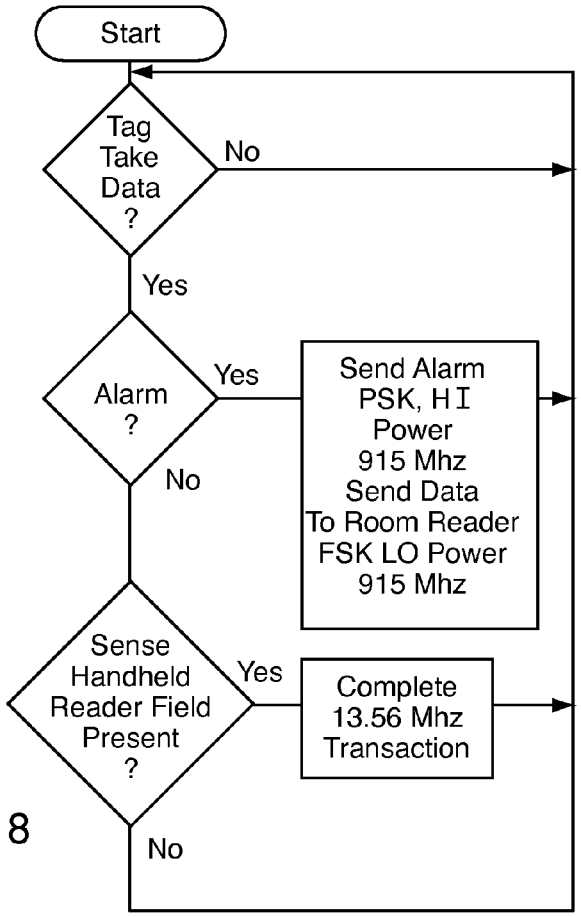
FIG. 8 is a flow chart depicting execution of intelligent multiplexing utilizing the semi-active tag of the present invention.

FIG. 8 is a flow chart depicting one preferred intelligent multiplexing mode of operation wherein the tag processor 20 is programmed for transmitting collected data such as patient heart rate at a first, relatively low power and short-range transmission mode when the collected data falls within a normal or acceptable range. This permits routine, non-alarm and relatively low power transmission of the collected data to a nearby reader 12, such as a low power hand-held reader of the type which may be located near the tag 10, e.g., a reader which may be located within a patient room, or carried by a nurse during normal rounds within a medical facility. However, in the event that the collected data fall outside the normal or acceptable range, the processor 20 may switch the receiver/transmitter circuitry for immediate higher power and longer-range transmission of the non-routine, alarm level data so that it can be received by a more distant reader located, e.g., at a central nurse station or the like.

Figure 9:
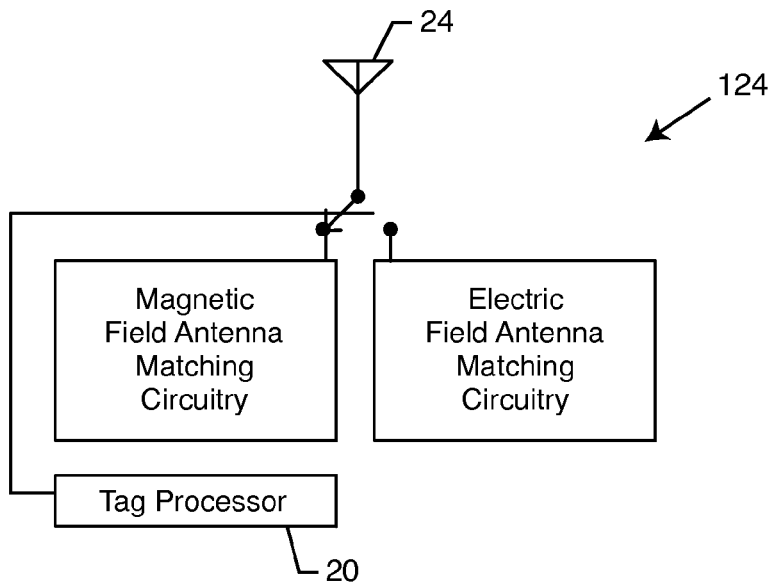
FIG. 9 is a schematic block diagram illustrating a dual mode antenna for use in the semi-active tag of the present invention.

A dual mode antenna system 124 is illustrated in FIG. 9 for processor-controlled switching between different frequencies and powers in an intelligent multiplexing system as described above. The processor 20 responds to data collected by regulated operation of the various tag circuit blocks (not shown in FIG. 9), typically in a background task mode, for switching the antenna 24 between a relatively low power magnetic field (H-field) mode for relatively short-range data transmission, and a comparatively higher-power electric field (E-field) mode for longer-range data transmission. In a preferred dual mode antenna system, the transmission frequencies are selected for compliance with regulations of the Federal Communications Commission (FCC) and for frequency compatibility with existing reader technology. For example, an H-field inductively coupled by a magnetic field frequency for signal reception and transmission is 13.56 megahertz (MHz), whereas an E-field electrically coupled by RF radiation frequency for signal transmission and reception is 902-928 MHz. The processor 20 sets the antenna system 124 for low-power (inductively coupled) reception with passive wake-up circuit and transmission to minimize power drain from the on-board battery (also not shown in FIG. 9), while increasing the reception/transmission power when required, e.g., in an alarm mode or the like.

Figure 10:
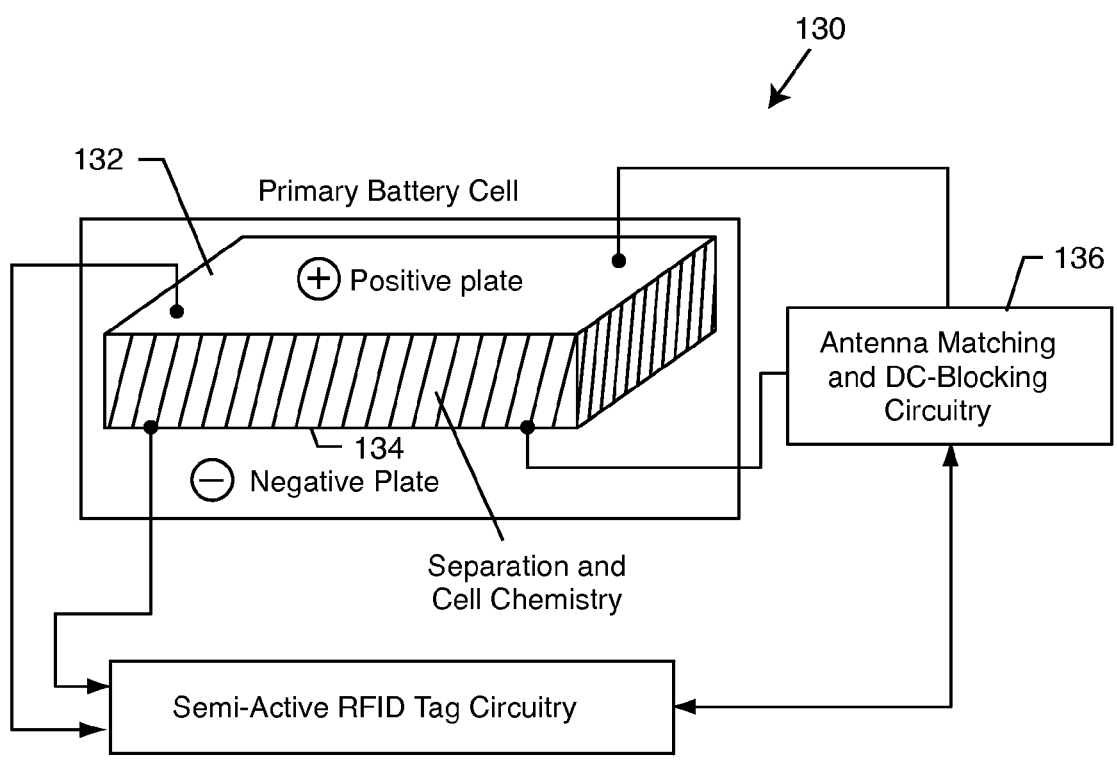
FIG. 10 is a schematic block diagram of an antenna/battery combination.

In accordance with further aspects of the invention, the on-board battery may be integrated with the antenna structure which may comprise a flexible construction. FIG. 10 depicts such combination battery-antenna 130 such as a primary battery cell defined between positive and negative charge plates 132 and 134. The charge plates are linked to antenna matching and DC blocking circuitry 136 to form the combination structure. In this regard, this circuitry may include a filter (not shown) to protect the battery from AC (alternating current) and/or DC (direct current) signal voltages exceeding the battery voltage capacity. The combined battery-antenna structure is shown coupled to the RFID tag circuitry such as depicted in FIGS. 2-4. The battery may further be designed for recharging from a source of ambient energy or an electrical connection to a re-charger. In the event of battery failure, the tag may be adapted to default to a conventional passive tag mode of operation.

In view of the foregoing description and accompanying drawings, persons skilled in the art will recognize and appreciate that the invention may be implemented in a variety of different specific forms and circuit configurations, some of which are set forth and briefly described by way of example in FIGS. 11-36.

Figure 11:
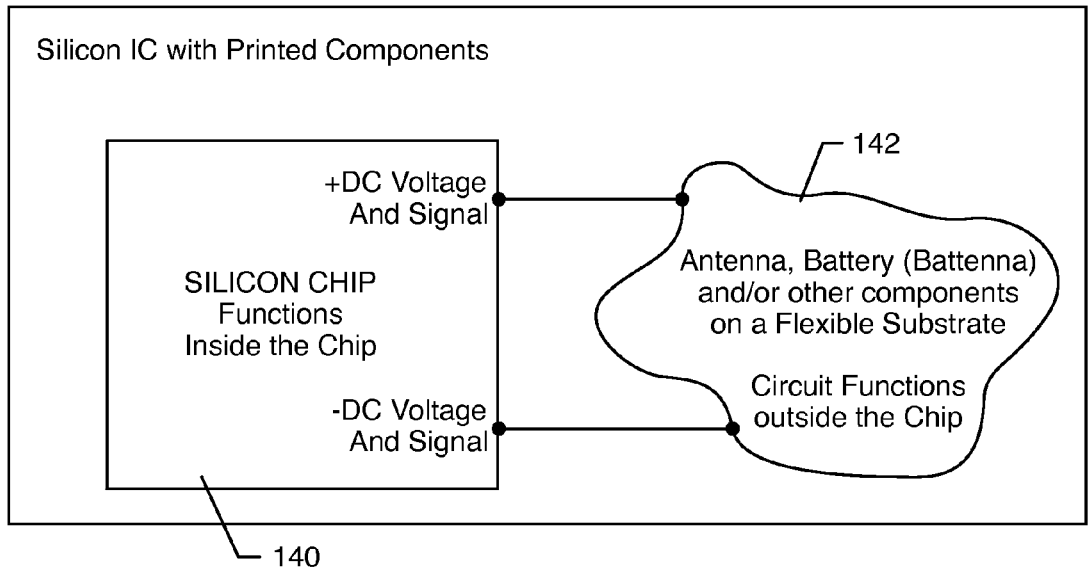
FIG. 11 is a simplified schematic diagram showing one preferred arrangement of the invention.

More particularly, FIG. 11 generally illustrates one preferred arrangement of the invention, wherein an IC (integrated circuit) chip 140 incorporates the RFID tag circuitry and includes two terminal connections coupled to external circuitry 142 such as a combined battery-antenna (battena) and other circuit components. The entire assembly may be mounted onto or otherwise integrated within a flexible substrate such as a wristband 14 of the type depicted in FIG. 1.

Figure 12:
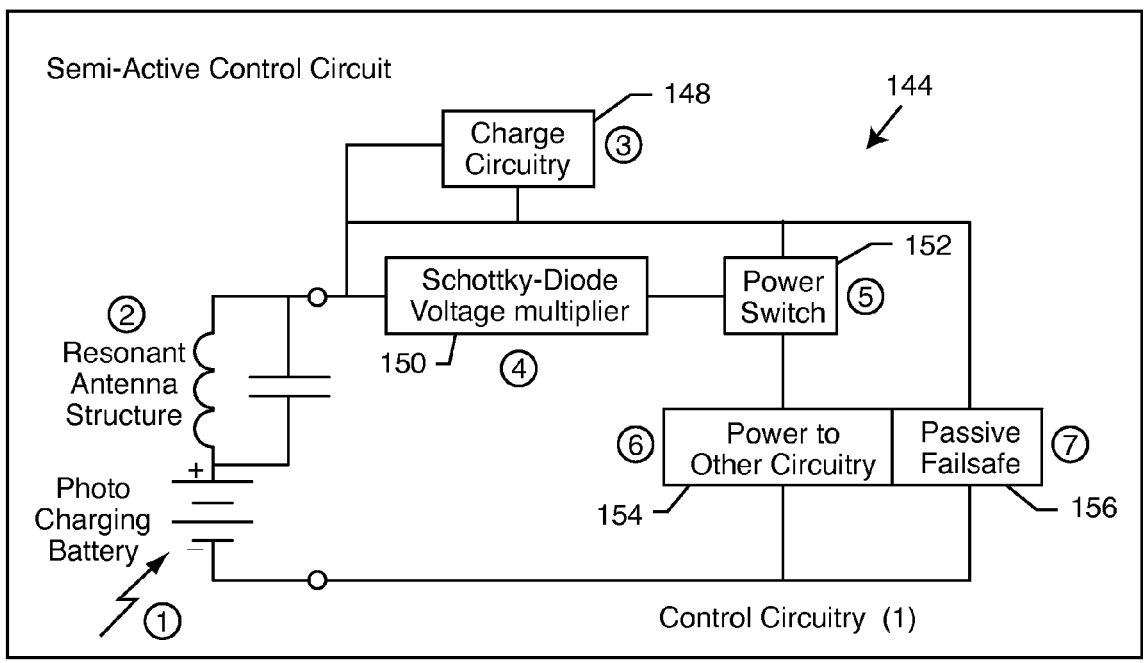
FIG. 12 is a schematic diagram showing an exemplary semi-active control circuit in accordance with the invention.

FIG. 12 depicts an exemplary semi-active control circuit 144 having a battery-antenna structure 146 including a battery component such as an RCSE (rectifying charge storage element) of the type shown and described in U.S. Pat. No. 6,414,543 which is incorporated by reference herein, or a photo-optic rechargeable battery, or the like, in combination with a series-mounted L-C tuned resonant antenna structure. The illustrative control circuit 144 includes charge circuitry 148 for recycling excess DC charge back to the rechargeable battery, and a voltage multiplier wake-up circuit 150 such as a Schottky-diode voltage multiplier for actuating a power switch 152 coupled to a power supply 154 or processor. This processor 154 functions as previously described (e.g., FIGS. 2-4) to regulate power linking in a programmed manner to other RFID circuit components (not shown in FIG. 12) to successfully complete a desired communication protocol in a manner consistent with power conservation. The processor 154 may include or be coupled to a failsafe circuit 156 for switching the control circuit 144 to a passive mode, in the event of battery power failure.

Figure 13:
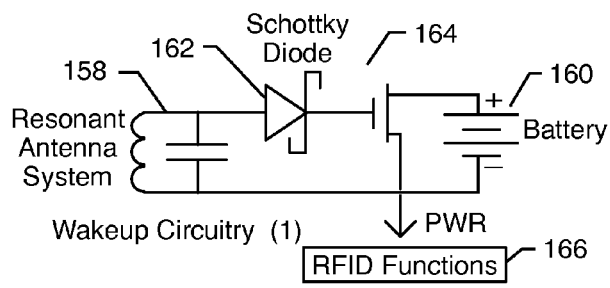
FIGS. 13-18 depict exemplary RFID circuit components which may be incorporated into the semi-active RFID tag of the present invention.

FIGS. 13-18 schematically illustrate a number of different RFID circuit components that may be incorporated into the semi-active RFID tag of the present invention. In particular, FIG. 13 shows an exemplary wake-up circuit including a resonant antenna 158 and battery 160. These components are coupled via a Schottky diode 162 and transistor 164 to provide a wake-up or activation signal to RFID circuit components 166, such as those shown and described in FIGS. 2-4.

Figure 14:
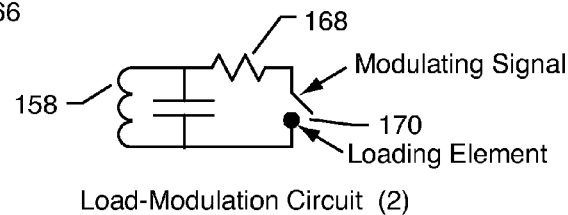
Figure 17:
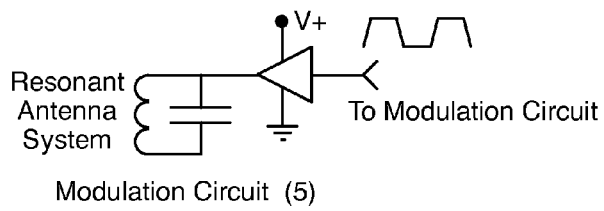

FIG. 14 illustrates a load-modulation circuit wherein the tuned resonant antenna 158 provides a modulating signal through a resistor 168 to a load element 170. An alternative modulation circuit construction is shown in FIG. 17.

Figure 15:
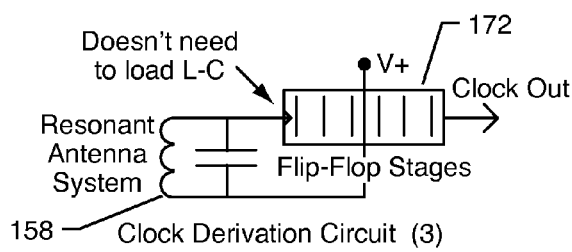

FIG. 15 shows a clock derivation circuit wherein the tuned resonant antenna 158 is coupled directly to a flip-flop clock element 172 which provides a clock output signal. The clock element 172 may be incorporated into the RFID tag in a variety of different circuit locations. The CMOS input stage to the clock does not present appreciable loading to the resonant antenna.

Figure 16:
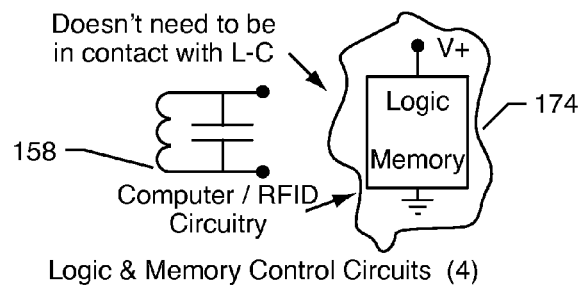

FIG. 16 shows the resonant antenna 158 in association with a logic memory device 174. The antenna component 158 may be coupled directly to the logic memory device 174, or the memory device may be incorporated into the RFID tag in a variety of other circuit locations without direct electrical contact to the L-C circuit.

Figure 18:
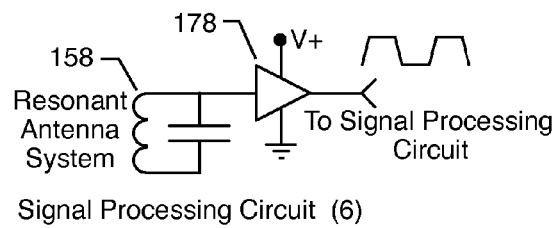

FIG. 18 depicts the resonant antenna 158 coupled to a signal amplifier 178 for providing an amplified signal output to other circuit components of the RFID tag.

Figure 19:
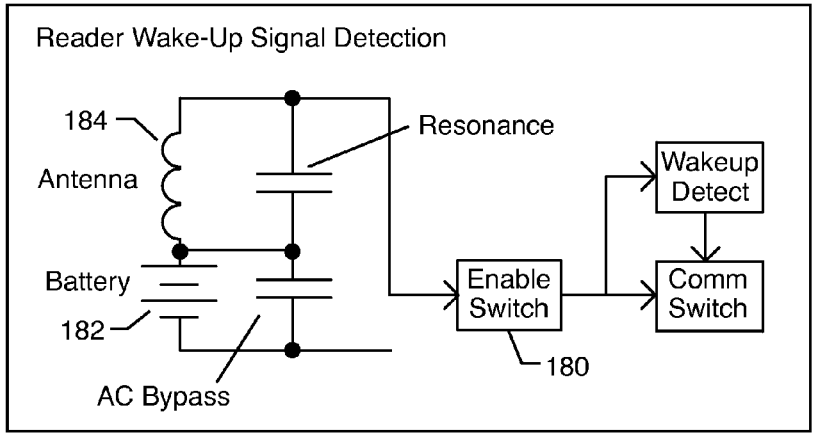
FIG. 19 is a schematic circuit diagram depicting an enable switch for activation of the RFID tag circuitry upon initial placement of the RFID tag into service.

FIG. 19 illustrates a further alternative form of the invention, wherein the RFID tag circuitry includes an enable switch 180 for enabling or activating the on-board battery when the RFID tag is issued or otherwise placed into service. FIG. 19 shows a combined battery-antenna structure including a battery power supply 182 and a tuned resonant antenna device 184 coupled to the enable switch 180. Thereafter, activation of RFID tag circuit components may be regulated according the input signal detected by the antenna 184, emanating from a nearby reader (not shown). That is, the RFID tag may be designed so that a detected input signal having a power or field strength below a selected threshold fails to implement or initiate a load modulation function, whereas a detected input signal greater than the selected threshold will initiate the load modulation function. Tag-to-reader communication may proceed by active signal injection by the tag circuitry to the antenna for transmission to the reader, or by load modulation, i.e., switching the antenna to a short circuit configuration suitable for transmission, or passively by switching to a threshold that allows the RFID circuitry to operate at a sufficient but minimal power level.

Figure 20:
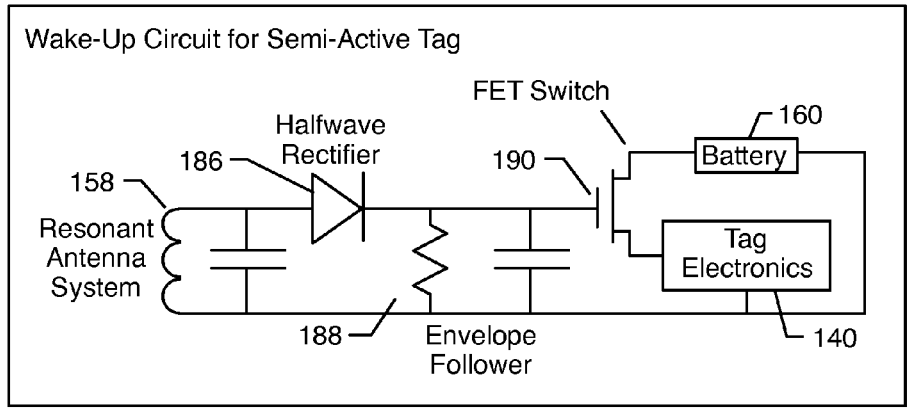
FIGS. 20-23 are schematic circuit diagrams illustrating alternative wake-up circuit configurations for activating the RFID tag circuit components.
Figure 21:
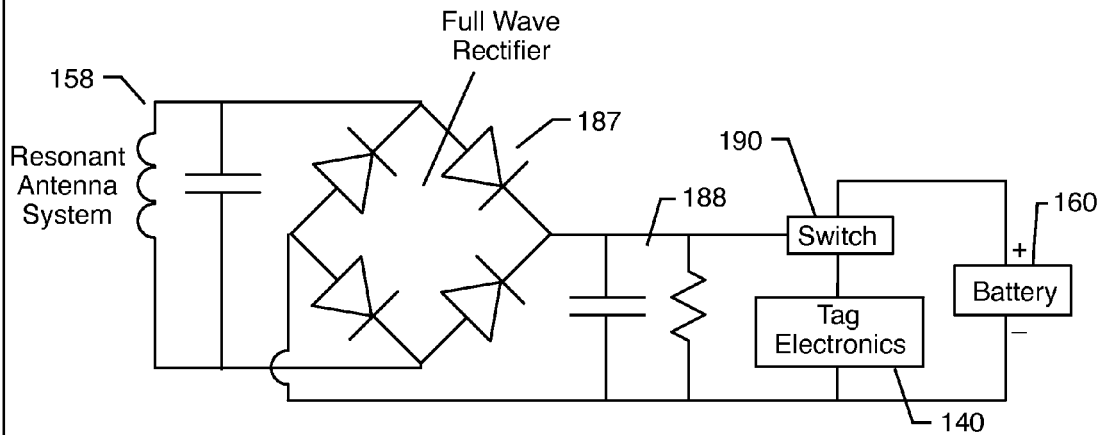
Figure 22:
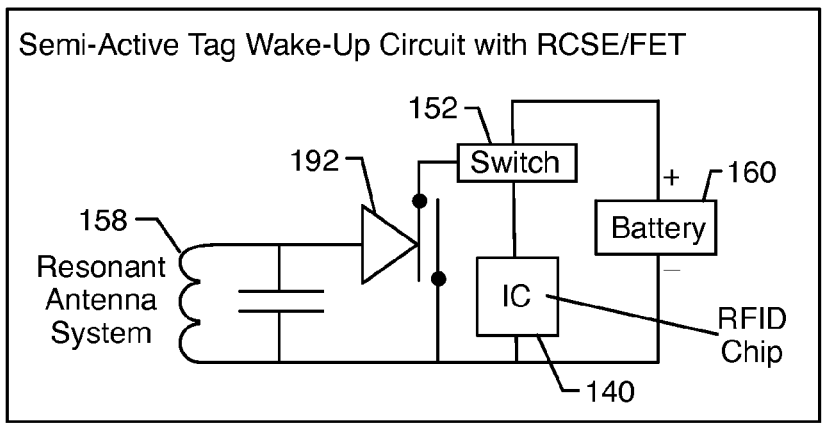
Figure 23:
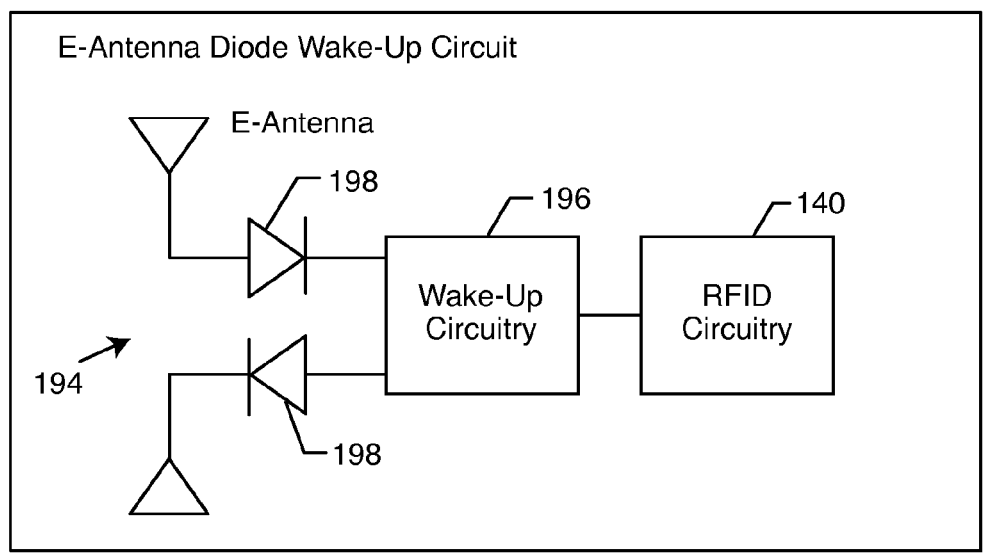

FIGS. 20-23 illustrate alternative wake-up circuit implementations coupled with the RFID tag circuitry. In this regard, FIG. 20 shows the tuned LC resonant antenna 158 and battery 160 coupled to the RFID tag circuit components which may be integrated as shown with an IC chip 140. The wake-up circuit further includes a half-wave rectifier 186, a passive low-pass filter 188, and an FET switch 190. FIG. 21 illustrates a similar circuit configuration wherein a full wave rectifier 187 is used. FIG. 22 shows another similar circuit configuration, but wherein a combined RCSE/FET switching circuit 192 is employed. FIG. 23 illustrates a simplified circuit arrangement wherein an E-field antenna 194 with dipole antenna elements is coupled to a wake-up circuit 196 via a pair of oppositely connected rectifying diodes 198. The wake-up circuit 196 is coupled in turn with the RFID tag circuitry, which, as previously described, may be incorporated within or upon an IC chip 140. Persons skilled in the art will recognize and appreciate that these various wake-up circuit implementations as shown and described may be modified to incorporate multiple coils for voltage multiplication, and/or differentiators for use therewith, wherein these components may be constructed from standard silicon components or printable components, or a combination thereof. In one form, inductive elements can be provided outside an IC chip (see FIG. 11) with other components being included alternatively within or outside of the IC chip.

Figure 24:
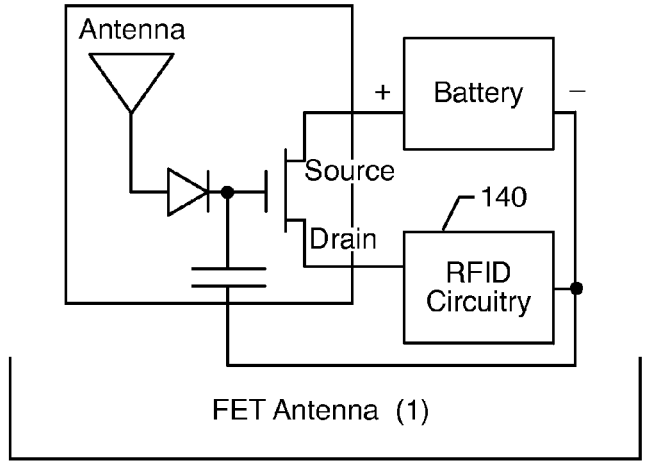
FIGS. 24-26 are schematic circuit diagrams illustrating alternative configurations for the RFID tag and related circuit components.
Figure 25:
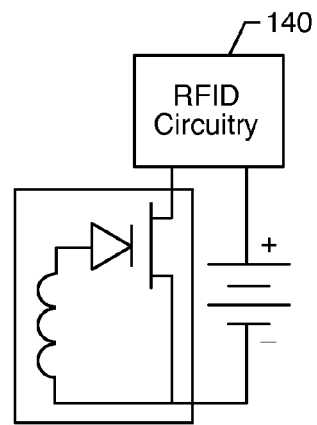
Figure 26:
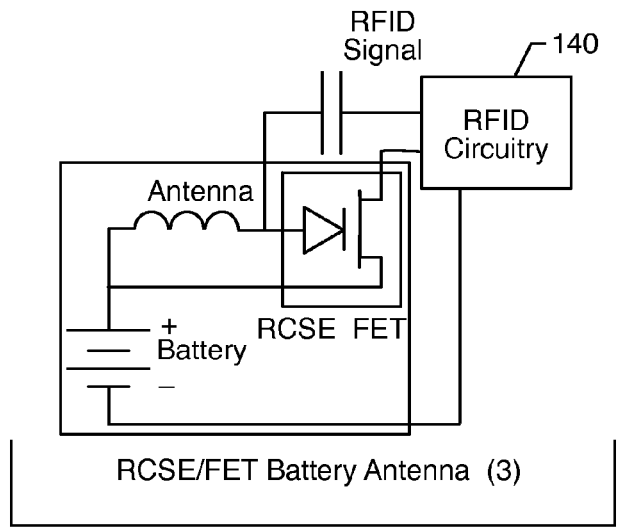

FIGS. 24-26 illustrate alternative configurations for the RFID tag and related circuit components, utilizing a two terminal IC chip 140 having the RFID circuitry thereon. In each case, a compound circuit element includes an RCSE-gated FET switch in which one source or drain terminal of the FET also comprises a positive or negative terminal of the associated battery, and an antenna (such as an inductive coil antenna) is connected from the common FET-battery terminal to the RCSE-gate terminal. In FIG. 24, and FET sensing switch is provided for activation of the semi-active RFID tag. Integral components are the antenna-FET gate, the FET switch, and the battery. FIG. 25 shows a RCSE-FET antenna with RCSE-transistor switch combination. The RCSE is integral with the FET switch gate, and an inductive antenna is integral to the outside terminal of the RCSE. FIG. 26 shows a similar RCSE-FET antenna integrated with a battery for supplying power to an RFID circuit when sufficient AC wake-up field strength is present. All of these configurations can be printable and made to interface with the RFID tag circuit components in chip or printable form.

Figure 35:
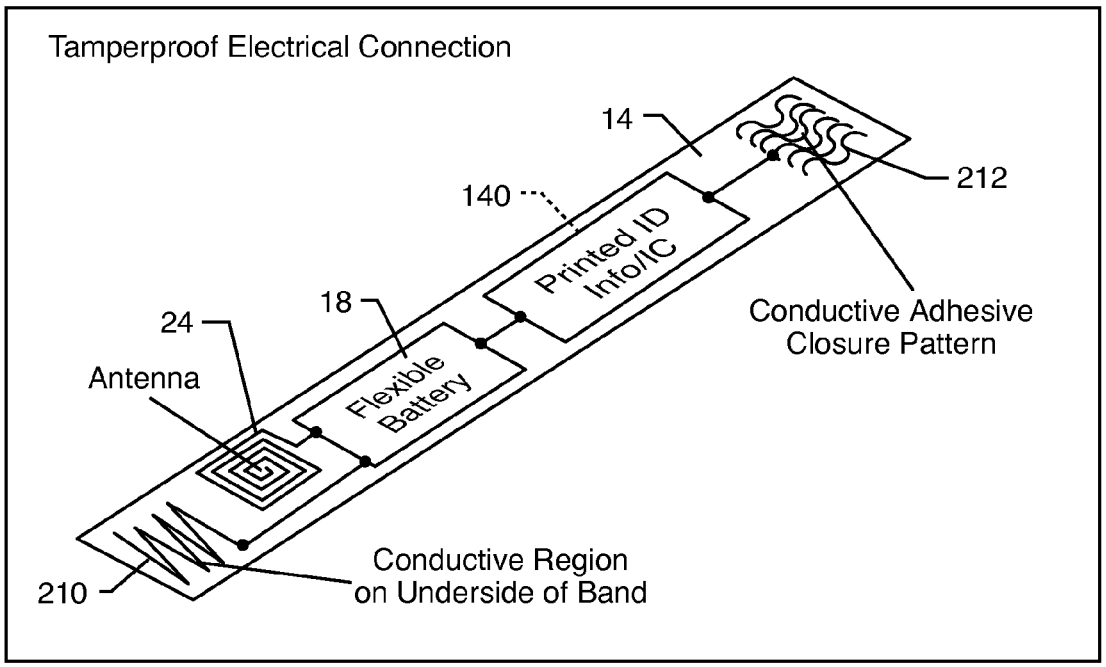
FIG. 35 is a perspective view depicting one preferred RFID tag configuration mounted onto a flexible wristband.
Figure 36:
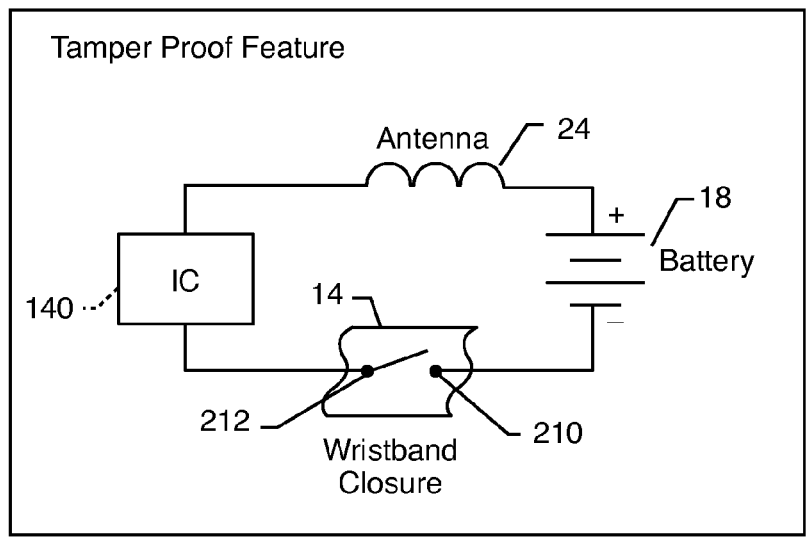
FIG. 36 is a schematic diagram showing tamper-proof mounting on the wristband of FIG. 35 onto a user's wrist.

FIG. 35 shows the RFID tag components mounted onto a substrate such as a flexible wristband 14. The tag components include the antenna 24 and battery 18, together with the RFID circuit components (as shown in FIGS. 2-4). The antenna 24 and battery 18 may comprise individual components as shown, and may have a flexible construction suitable for mounting as by printing or other suitable processes onto the flexible wristband substrate 14. In addition, the RFID circuit components may comprise an IC chip, or have a chipless construction including individual circuit elements, all conveniently mounted onto and supported by the flexible wristband substrate 14. The wristband 14 may further incorporate conductive adhesive patterns 210 and 212 at opposite ends thereof, wherein these conductive adhesive patterns 210, 212 engage and overlie each other when the wristband is mounted in a closed loop configuration onto a wearer's wrist or the like. As shown best in FIG. 36, these conductive patterns 210, 212 provide a closed circuit when the wristband is properly mounted, wherein this closed circuit may be used to enable or activate the RFID tag for operation. In addition, the conductive patterns 210, 212 provide a convenient tamper-proof feature for disabling the RFID tag upon cutting or other severance of the loop upon removal of the wristband from the wrist or the like of an authorized wearer.

Figure 27:
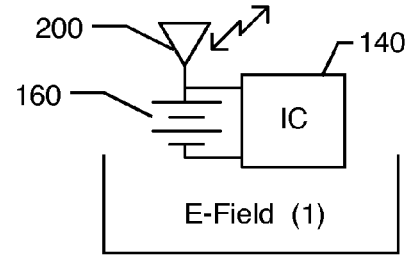
FIGS. 27-29 are additional schematic circuit diagrams depicting combined battery-antenna wake-up circuits.
Figure 28:
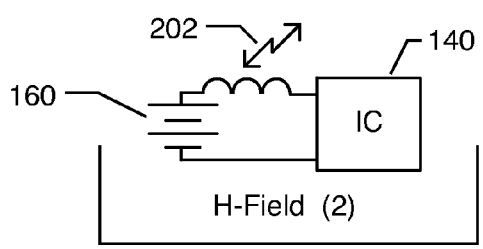
Figure 29:
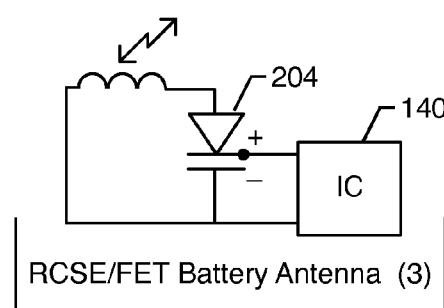

FIGS. 27-29 show alternative circuit configurations including a combination battery and antenna structure for powering the RFID circuit components carried on a dual terminal IC chip 140. FIG. 27 depicts an E-field antenna 200 connected to a terminal of a battery 160 and to a terminal of the IC chip 140. In this configuration, the E-field antenna would need to be decoupled from the low impedance of the battery. FIG. 28 shows an H-field antenna (loop) 202 in series between a terminal of the battery 160 and the IC chip 140. FIG. 29 shows an inductive antenna 202 in combination with an RCSE charge storage device or battery 204 for providing rectified power to the IC chip 140. In each of these versions of the invention, the battery component is rechargeable and, if desired, printable onto a flexible substrate. The specific battery-antenna configuration may take different forms, including but not limited to one or more coils, patch-type which may include fractal geometries. In addition, although the RFID circuit components are illustrated as being programmed onto the IC chip 140, persons skilled in the art will understand that a chipless circuit configuration including fabricated components may be employed.

Figure 30:
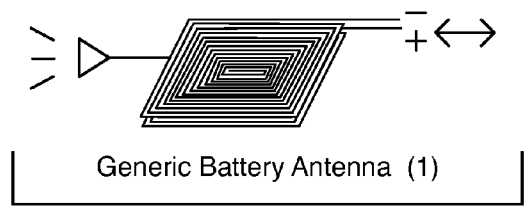
FIGS. 30-34 illustrate alternative examples of combination battery-antenna structures.
Figure 31:
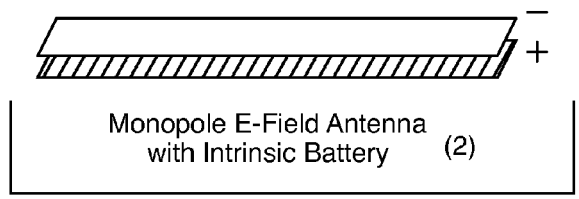
Figure 32:
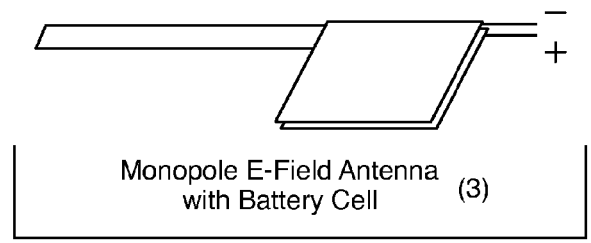
Figure 33:
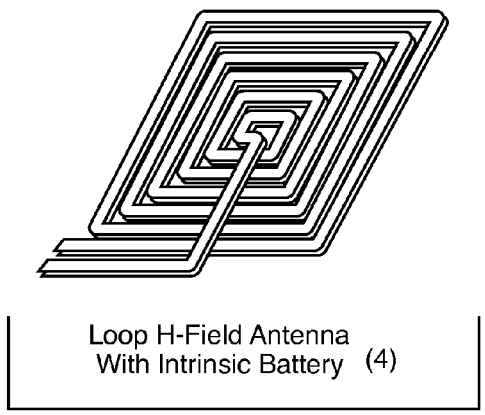
Figure 34:
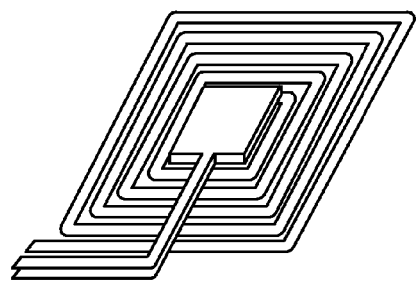

FIGS. 30-34 show alternative examples of combination battery-antenna structures of the type that may be employed in the invention. FIG. 30 shows a basic battery-antenna combination wherein one terminal of the battery is formed to define and provide the antenna structure for the single combination fabricated unit. FIG. 31 further depicts this concept in the form of monopole E-field antenna in combination with an intrinsic battery. FIG. 32 depicts a similar concept with a monopole E-field antenna wherein the battery cell is shaped as part of the monopole antenna structure, with the antenna extending from the V+ terminal of the battery. FIG. 33 illustrates a loop H-field antenna with intrinsic battery, wherein the entire battery is formed into the shape of a loop antenna. FIG. 34 depicts a similar concept but wherein the battery cell is shaped as an area within the loop antenna structure. These various combination battery-antenna structures may incorporate a variety of further configurations, including but not limited to fractal patterns and patch antennae and the like.

FIG. 35 shows the RFID tag components mounted onto a substrate such as a flexible wristband 14. The tag components include the antenna 24 and battery 18, together with the RFID circuit components (as shown in FIGS. 2-4). The antenna 24 and battery 18 may comprise individual components as shown, and may have a flexible construction suitable for mounting as by printing or other suitable processes onto the flexible wristband substrate 14. In addition, the RFID circuit components may comprise an IC chip, or have a chipless construction including individual circuit elements, all conveniently mounted onto and supported by the flexible wristband substrate 14. The wristband 14 may further incorporate conductive adhesive patterns 210 and 212 at opposite ends thereof, wherein these conductive adhesive patterns 210, 212 engage and overlie each other when the wristband is mounted in a closed loop configuration onto a wearer's wrist or the like. As shown best in FIG. 36, these conductive patterns 210, 212 provide a closed circuit when the wristband is properly mounted, wherein this closed circuit may be used to enable or activate the RFID tag for operation. In addition, the conductive patterns 210, 212 provide a convenient tamper-proof feature for disabling the RFID tag upon cutting or other severance of the loop upon removal of the wristband from the wrist or the like of an authorized wearer.

Although various embodiments and alternatives have been described in detail for purposes of illustration, various further modifications may be made without departing from the scope and spirit of the invention. Accordingly, no limitation on the invention is intended by way of the foregoing description and drawings, except as set forth in the appended claims.

What is claimed is:

1. A semi-active radio frequency identification (RFID) tag for communicating with the tag reader, said tag comprising:
    tag circuitry adapted to receive and store information pertaining to a person or object associated with said tag;
    an antenna for receiving and transmitting information signals relative to the tag reader;
    an on-board battery for powering said tag circuitry; and
    a power management system including a processor circuit for controllably coupling said on-board battery to enable selected limited portions of said tag circuitry sufficient to complete a communication protocol while prolonging battery service life;
    wherein said tag circuitry comprises a plurality of circuit blocks, said power management system controllably coupling specific ones of said circuit blocks to said on-board battery each for an individually controlled time interval sufficient to complete said communication protocol, and wherein said power management system is adapted for defaulting to a passive operation mode upon battery failure and for controllably coupling specific ones of said circuit blocks to an external power source sufficient to complete said communication protocol.

2. The semi-active radio frequency identification tag of claim 1 further including means for mounting said tag onto the person or object associated therewith.

3. The semi-active radio frequency identification tag of claim 2 wherein said mounting means comprises a flexible wristband.

4. The semi-active radio frequency identification tag of claim 1 wherein said on-board battery comprises a flexible battery.

5. The semi-active radio frequency identification tag of claim 1 wherein said on-board battery is rechargeable.

6. The semi-active radio frequency identification tag of claim 1 wherein said tag circuitry comprises a wake-up circuit coupled to said antenna for activating said power management system upon detection of a communication signal from the tag reader, said processor circuit thereupon controllably enabling said selected limited portions of said tag circuitry sufficient to complete said communication protocol.

7. The semi-active radio frequency identification tag of claim 6 wherein said wake-up circuit comprises a passive wake-up circuit powered by field energy emanating from the tag reader.

8. The semi-active radio frequency identification tag of claim 6 wherein said wake-up circuit comprises an active wake-up circuit powered by said on-board battery.

9. The semi-active radio frequency identification tag of claim 1 wherein said communication protocol comprises a selected one of a plurality of different communication protocols.

10. The semi-active radio frequency identification tag of claim 1 wherein at least one of said circuit blocks comprises a sensor for monitoring a selected parameter associated with the person or object associated with said tag.

11. The semi-active radio frequency identification tag of claim 1 wherein said power management system is responsive to a communication signal from the tag reader to implement a reader-initiated communication protocol.

12. The semi-active radio frequency identification tag of claim 11 wherein said power management system is further adapted to transmit a communication signal to the tag reader to implement the tag-initiated communication protocol.

13. The semi-active radio frequency identification tag of claim 1 wherein said power management system is adapted to transmit a communication signal to the tag reader to implement the tag-initiated communication protocol.

14. The semi-active radio frequency identification tag of claim 10 wherein said processor circuit controllably enables selected limited portions of said tag circuitry in a background task mode sufficient to collect and store data, between communication sessions with the tag reader.

15. The semi-active radio frequency identification tag of claim 1 wherein said power management system is responsive in a first mode to a communication signal from the tag reader to implement a reader-initiated communication protocol, and in a second mode to implement the tag-initiated communication protocol.

16. The semi-active radio frequency identification tag of claim 15 wherein said second mode comprises an alarm mode.

17. The semi-active radio frequency identification tag of claim 1 wherein said antenna comprises a dual mode antenna adapted for operation at a first relatively low power mode, and at a second comparatively higher power mode.

18. The semi-active radio frequency identification tag of claim 17 wherein said first antenna mode comprises a magnetic field mode at a first frequency, and wherein said second antenna mode comprises an electric field mode at a second frequency.

19. The semi-active radio frequency identification tag of claim 1 wherein said antenna and said on-board battery comprise a combination unit.

20. The semi-active radio frequency identification tag of claim 1 wherein said tag circuitry comprises an integrated chip.

21. The semi-active radio frequency identification tag of claim 1 wherein said battery comprises a rectifying charge storage element.

22. The semi-active radio frequency identification tag of claim 6 wherein said wake-up circuit comprises a voltage multiplier circuit.

23. The semi-active radio frequency identification tag of claim 22 wherein said wake-up circuit includes a Schottky diode.

24. The semi-active radio frequency identification tag of claim 1 wherein said antenna comprises a tuned resonant antenna.

25. The semi-active radio frequency identification tag of claim 1 wherein said tag circuitry includes a clock element.

26. The semi-active radio frequency identification tag of claim 1 wherein said tag circuitry includes a logic memory device.

27. The semi-active radio frequency identification tag of claim 1 wherein said tag circuitry includes a load modulation circuit responsive to a detected input signal from the tag reader.

28. The semi-active radio frequency identification tag of claim 6 wherein said wake-up circuit includes a rectifier circuit and an FET switch.

29. The semi-active radio frequency identification tag of claim 6 wherein said wake-up circuit includes a switching circuit comprises a combined rectifying charge storage element/FET switch.

30. The semi-active radio frequency identification tag of claim 6 wherein said antenna comprises a dipole antenna, and further wherein said wake-up circuit is connected to said dipole antenna by a pair of oppositely connected rectifying diodes.

31. The semi-active radio frequency identification tag of claim 1 wherein said tag circuitry comprises an integrated chip coupled to an FET switch gated by a rectifying charge storage element.

32. The semi-active radio frequency identification tag of claim 31 wherein said antenna, FET switch and battery are provided as an integral unit.

33. The semi-active radio frequency identification tag of claim 1 wherein said antenna comprises a monopole E-field antenna.

34. The semi-active radio frequency identification tag of claim 33 wherein said battery comprises a portion of said antenna.

35. The semi-active radio frequency identification tag of claim 1 wherein said battery comprises a monopole H-field antenna.

36. The semi-active radio frequency identification tag of claim 35 wherein said battery comprises a portion of said antenna.

37. A semi-active radio frequency identification (RFID) tag for communicating with the tag reader, said tag comprising:
tag circuitry adapted to receive and store information pertaining to a person or object associated with said tag, said tag circuitry including a plurality of circuit blocks, at least one of said circuit block comprising a sensor;
an antenna for receiving and transmitting information signals relative to the tag reader;
an on-board battery for powering said tag circuitry; and
a power management system including a processor circuit for controllably coupling said on-board battery to enable specific ones of said circuit blocks each for an individually controlled time interval sufficient to complete a communication protocol while prolonging battery service life, wherein said power management system is adapted for defaulting to a passive operation mode upon battery failure and for controllably coupling specific ones of said circuit blocks to an external power source sufficient to complete said communication protocol.

38. The semi-active radio frequency identification tag of claim 37 further comprising a wake-up circuit coupled to said antenna for activating said power management system upon detection of a communication signal from the tag reader, said processor circuit thereupon controllably enabling said specific ones of said circuit blocks sufficient to complete said communication protocol.

39. The semi-active radio frequency identification tag of claim 38 wherein said wake-up circuit comprises a passive wake-up circuit powered by field energy emanating from the tag reader.

40. The semi-active radio frequency identification tag of claim 38 wherein said wake-up circuit comprises an active wake-up circuit powered by said on-board battery.

41. The semi-active radio frequency identification tag of claim 37 wherein said communication protocol comprises a selected one of a plurality of different communication protocols.

42. The semi-active radio frequency identification tag of claim 37 wherein said power management system is responsive to a communication signal from the tag reader to implement a reader-initiated communication protocol.

43. The semi-active radio frequency identification tag of claim 42 wherein said power management system is further adapted to transmit a communication signal to the tag reader to implement the tag-initiated communication protocol.

44. The semi-active radio frequency identification tag of claim 37 wherein said power management system is adapted to transmit a communication signal to the tag reader to implement the tag-initiated communication protocol.

45. The semi-active radio frequency identification tag of claim 37 wherein said processor circuit controllably enables selected limited portions of said tag circuitry in a background task mode sufficient to collect and store data, between communication sessions with the tag reader.

46. The semi-active radio frequency identification tag of claim 37 wherein said power management system is responsive in a first mode to a communication signal from the tag reader to implement a reader-initiated communication protocol, and in a second mode to implement the tag-initiated communication protocol.

47. The semi-active radio frequency identification tag of claim 37 wherein said antenna comprises a dual mode antenna adapted for operation at a first, relatively low power mode, and at a second, comparatively higher power mode.

48. A semi-active radio frequency identification (RFID) tag and tag reader system, comprising:
the tag reader; and
an RFID tag including tag circuitry adapted to receive and store information pertaining to a person or object associated with said tag, an antenna for receiving and transmitting information signals in the course of a communication session between said tag and said tag reader, an on-board battery for powering said tag circuitry, and a power management system including a processor circuit for controllably coupling said on-board battery to enable selected limited portions of said tag circuitry sufficient to complete said communication session while prolonging battery service life, wherein said tag circuitry comprises a plurality of circuit blocks, said power management system controllably coupling specific ones of said circuit blocks to said on-board battery each for an individually controlled time interval sufficient to complete said communication session, and wherein said power management system is adapted for defaulting to a passive operation mode upon battery failure and for controllably coupling specific ones of said circuit blocks to an external power source sufficient to complete a communication protocol.

49. The system of claim 48 wherein said tag circuitry comprises a wake-up circuit coupled to said antenna for activating said power management system upon detection of a communication signal from the tag reader, said processor circuit thereupon controllably enabling said selected limited portions of said tag circuitry sufficient to complete said communication protocol.

50. The system of claim 49 wherein said wake-up circuit comprises a passive wake-up circuit powered by field energy emanating from the tag reader.

51. The system of claim 49 wherein said wake-up circuit comprises an active wake-up circuit powered by said on-board battery.

52. The system of claim 48 wherein said communication session comprises a selected one of a plurality of different communication protocols.

53. The system of claim 48 wherein at least one of said circuit blocks comprises a sensor for monitoring a selected parameter associated with the person or object associated with said tag.

54. The system of claim 48 wherein said power management system is responsive to a communication signal from the tag reader to implement a reader-initiated communication session.

55. The system of claim 54 wherein said power management system is further adapted to transmit a communication signal to the tag reader to implement the tag-initiated communication session.

56. The system of claim 48 wherein said power management system is adapted to transmit a communication signal to the tag reader to implement a tag-initiated communication session.

57. The system of claim 48 wherein said processor circuit controllably enables selected limited portions of said tag circuitry in a background task mode sufficient to collect and store data, between communication sessions with said tag reader.

58. The system of claim 48 wherein said power management system is responsive in a first mode to a communication signal from the tag reader to implement a reader-initiated communication protocol, and in a second mode to implement the tag-initiated communication protocol.

59. The system of claim 58 wherein said second mode comprises an alarm mode.

60. The system of claim 48 wherein said antenna comprises a dual mode antenna adapted for operation at a first, relatively low power mode, and at a second, comparatively higher power mode.

61. In a semi-active radio frequency identification (RFID) tag for communicating with the tag reader, said tag comprising tag circuitry having multiple circuit blocks adapted to receive and store information pertaining to a person or object associated with said tag, an antenna for receiving and transmitting information signals relative to the tag reader, and an on-board battery for powering said tag circuitry, the tag power consumption control process comprising the steps of:
providing a power management system including a processor circuit for regulating coupling of said circuit blocks to said on-board battery;
controllably coupling specific selected ones of said circuit blocks to said on-board battery each for an individually controlled time interval sufficient to complete a specific communication protocol; and
defaulting to a passive operation mode upon battery failure and for thereupon controllably coupling specific ones of said circuit blocks to an external power source sufficient to complete said communication protocol.

62. The process of claim 61 wherein said coupling step is responsive to a communication session initiated by the tag reader.

63. The process of claim 61 wherein said coupling step is responsive to a communication session initiated by the tag.

64. The process of claim 61 wherein said coupling step is responsive to a communication session initiated by one of the tag and the tag reader.

65. The process of claim 61 wherein said coupling step operates the tag in a background task mode sufficient to collect and store data, between communication sessions with the tag reader.

66. The process of claim 61 further including the step of operating the power management system in a first mode in response to a communication signal from the tag reader to implement a reader-initiated communication protocol, and in a second mode to implement the tag-initiated communication protocol.

67. The process of claim 66 wherein said second mode comprises an alarm mode.

68. The process of claim 66 including the step of operating the antenna at a first, relatively low power in said first mode, and at a second, comparatively higher power in said second mode.

69. An electronic tag for communicating with the tag reader, said tag comprising:
tag circuitry adapted to receive and store information pertaining to a person or object associated with said tag;
an antenna for receiving and transmitting information signals relative to the tag reader;
a battery for powering said tag circuitry; and
a power management system including a processor circuit for controllably coupling said battery to enable selected portions of said tag circuitry sufficient to complete a communication protocol;
wherein said tag circuitry comprises a plurality of circuit blocks, said power management system controllably coupling specific ones of said circuit blocks to said battery each for an individually controlled time interval sufficient to complete said communication protocol, wherein said power management system is adapted for defaulting to a passive operation mode upon battery failure and for controllably coupling specific ones of said circuit blocks to an external power source sufficient to complete said communication protocol, wherein said communication protocol comprises a selected one of a plurality of different communication protocols, and wherein at least one of said circuit blocks comprises a sensor for monitoring a selected parameter associated with the person or object associated with said tag.

70. The electronic tag of claim 69 further including means for mounting said tag onto the person or object associated therewith.

71. The electronic tag of claim 69, wherein the tag comprises an RFID card, tag, label, inlet, bracelet, or other electronic device.

72. The electronic tag of claim 69 wherein said battery comprises a flexible rechargeable battery.

73. The electronic tag of claim 69 wherein said tag circuitry comprises a wake-up circuit coupled to said antenna for activating said power management system upon detection of a communication signal from the tag reader, said processor circuit thereupon controllably enabling said selected portions of said tag circuitry sufficient to complete said communication protocol.

74. The electronic tag of claim 73 wherein said wake-up circuit comprises a passive wake-up circuit powered by field energy emanating from the tag reader, or an active wake-up circuit powered by said battery.

75. The electronic tag of claim 69 wherein said power management system is responsive to a communication signal from the tag reader to implement a reader-initiated communication protocol, and wherein said power management system is further adapted to transmit a communication signal to the tag reader to implement the tag-initiated communication protocol.

76. The electronic tag of claim 69 wherein said power management system is adapted to transmit a communication signal to the tag reader to implement the tag-initiated communication protocol, and wherein said processor circuit controllably enables selected portions of said tag circuitry in a background task mode sufficient to collect and store data, between communication sessions with the tag reader.

77. The electronic tag of claim 69 wherein said power management system is responsive in a first mode to a communication signal from the tag reader to implement a reader-initiated communication protocol, and in a second mode to implement the tag-initiated communication protocol, wherein said second mode comprises an alarm mode.

78. The electronic tag of claim 69 wherein said antenna comprises a dual mode antenna adapted for operation at a first relatively low power mode, and at a second comparatively higher power mode, wherein said first antenna mode comprises a magnetic field mode at a first frequency, and wherein said second antenna mode comprises an electric field mode at a second frequency.

79. The electronic tag of claim 69 wherein said antenna and said battery comprise a combination unit, wherein said tag circuitry comprises an integrated chip, and wherein said battery comprises a rectifying charge storage element.

80. The electronic tag of claim 73 wherein said wake-up circuit comprises a voltage multiplier circuit, and wherein said wake-up circuit includes a Schottky diode.

81. The electronic tag of claim 69 wherein said antenna comprises a tuned resonant antenna, said tag circuitry includes a clock element, said tag circuitry includes a logic memory device, and wherein said tag circuitry includes a load modulation circuit responsive to a detected input signal from the tag reader.

82. The electronic tag of claim 73 wherein said wake-up circuit includes a rectifier circuit and an FET switch, and wherein said antenna comprises a dipole antenna, and further wherein said wake-up circuit is connected to said dipole antenna by a pair of oppositely connected rectifying diodes.

83. The electronic tag of claim 69 wherein said tag circuitry comprises an integrated chip coupled to an FET switch gated by a rectifying charge storage element, wherein said antenna, FET switch and battery are provided as an integral unit.

84. The electronic tag of claim 69 wherein said antenna comprises a monopole E-field antenna, and wherein said battery comprises a portion of said antenna.

85. The electronic tag of claim 69 wherein said battery comprises a monopole H-field antenna, and wherein said battery comprises a portion of said antenna.

* * * * *